United States Patent
Chen et al.

(10) Patent No.: US 11,592,354 B2
(45) Date of Patent: Feb. 28, 2023

(54) PHASE-DISTORTION MITIGATION FOR AN OPTICAL VECTOR NETWORK ANALYZER

(71) Applicant: Nokia Solutions and Networks OY, Espoo (FI)

(72) Inventors: Haoshuo Chen, Aberdeen, NJ (US); Nicolas Fontaine, Keyport, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/166,799

(22) Filed: Feb. 3, 2021

(65) Prior Publication Data
US 2022/0244136 A1    Aug. 4, 2022

(51) Int. Cl.
*G01M 11/00*     (2006.01)

(52) U.S. Cl.
CPC .................. *G01M 11/331* (2013.01)

(58) Field of Classification Search
CPC .. G01M 11/00; G01M 11/02; G01M 11/0207; G01M 11/33; G01M 11/331; G01M 11/332; G01B 9/02004; G01B 9/0207; G01B 9/02071; G01B 9/02072; G01B 9/02074; G01B 9/02075; G01B 9/02078; G01B 9/02079; G01B 9/02081; G01J 9/02; G01J 9/04; G01J 2009/0203; G01J 2009/0207; G01J 2009/0211; G01J 2009/0242; G01J 2009/0249; G01J 2009/0253; G01J 2009/0265
See application file for complete search history.

(56) References Cited

U.S. PATENT DOCUMENTS

| | | | |
|---|---|---|---|
| 6,900,895 B2 | 5/2005 | Van Wiggeren | |
| 6,900,897 B2 * | 5/2005 | Froggatt | G01J 9/0246 356/73.1 |
| 7,009,691 B2 * | 3/2006 | VanWiggeren | G01M 11/338 356/73.1 |
| 7,515,276 B2 * | 4/2009 | Froggatt | G01M 11/3172 356/73.1 |

(Continued)

FOREIGN PATENT DOCUMENTS

WO    2017067255 A1    4/2017

OTHER PUBLICATIONS

Chen, Haoshuo, et al. "Multiport Swept-Wavelength Interferometer with Laser Phase Noise Mitigation Employing Broadband Ultra-Weak FBG Array." Optics Letters 45.21 (2020): 5913-5916.

(Continued)

*Primary Examiner* — Gordon J Stock, Jr.
(74) *Attorney, Agent, or Firm* — Mendelsohn Dunleavy, P.C.; Yuri Gruzdkov; Steve Mendelsohn

(57) ABSTRACT

An OVNA system employing an array of reference delays to estimate distance-variant phase distortion in probe light during an optical-frequency sweep thereof. The estimated distance-variant phase distortion is then used to perform a phase correction for the digital electrical signals generated in response to the probe light being passed through a device under test (DUT) during the same optical-frequency sweep. Advantageously, the performed phase correction enables the OVNA system to provide a more-accurate determination of certain optical characteristics of the DUT than that achievable without such phase correction.

18 Claims, 10 Drawing Sheets

(56) References Cited

U.S. PATENT DOCUMENTS

| | | | |
|---|---|---|---|
| 7,948,633 B2* | 5/2011 | Froggatt | G01M 11/3172 |
| | | | 356/479 |
| 8,339,591 B2* | 12/2012 | Volanthen | G01B 11/18 |
| | | | 356/73.1 |
| 8,842,992 B2 | 9/2014 | Middleton et al. | |
| 9,411,100 B2* | 8/2016 | Fontaine | H04J 14/04 |
| 10,284,303 B2* | 5/2019 | Zhu | H04L 7/0075 |
| 10,345,192 B2* | 7/2019 | Chen | G01M 11/3127 |
| 10,505,641 B2* | 12/2019 | Kaneda | H04B 10/6164 |
| 10,615,874 B2* | 4/2020 | Chen | H04B 10/66 |
| 11,035,754 B2* | 6/2021 | Neilson | G01D 5/35316 |
| 2005/0046860 A1 | 3/2005 | Waagaard et al. | |
| 2006/0061770 A1* | 3/2006 | Erskine | G01J 3/10 |
| | | | 356/484 |
| 2009/0103100 A1 | 4/2009 | Froggatt et al. | |
| 2015/0330848 A1 | 11/2015 | Digonnet et al. | |
| 2017/0276470 A1 | 9/2017 | Mori | |
| 2018/0135971 A1 | 5/2018 | Han | |
| 2018/0156598 A1 | 6/2018 | Cable et al. | |

OTHER PUBLICATIONS

Cheng, Cheng, et al. "Ultra-weak FBG array for fiber-optic sensing applications" 2018 23rd Opto-Electronics and Communications Conference (OECC). Jul. 2-6, 2018. Jeju, Korea. IEEE (2018): 1-4.

Ding, Zhenyang, et al. "Compensation of laser frequency tuning nonlinearity of a long range OFDR using deskew filter." Optics Express 21.3 (2013): 3826-3834.

Ding, Zhenyang, et al. "Distributed Optical Fiber Sensors Based on Optical Frequency Domain Reflectometry: A review." Sensors 18.4 (2018): 1072 (31 pages).

Fan, Xinyu, et al. "Phase-Noise-Compensated Optical Frequency-Domain Reflectometry" IEEE Journal of Quantum Electronics 45.6 (2009): 594-602.

Gifford, Dawn K., et al. "Optical vector network analyzer for single-scan measurements of loss, group delay, and polarization mode dispersion." Applied Optics 44.34 (2005): 7282-7286.

Grüner-Nielsen, Lars, et al. "Few Mode Transmission Fiber With Low DGD, Low Mode Coupling, and Low Loss." Journal of Lightwave Technology 30.23 (2012): 3693-3698.

Marti, Javier, et al. "Experimental reduction of fiber-induced intensity noise in analog optical links employing chirped fiber Bragg gratings." IEEE MTT-S International Microwave Symposium Digest, Jun. 8-13, 2003. Philadelphia, Pennyslvania, vol. 1. Paper TU5C-5. IEEE (2003): 277-279.

Moore, Eric D., et al. "Correction of sampling errors due to laser tuning rate fluctuations in swept-wavelength interferometry." Optics Express 16.17 (2008): 13139-13149.

Rommel, Simon, et al. "Few-mode fiber, splice and SDM component characterization by spatially-diverse optical vector network analysis." Optics Express 25.19 (2017): 22347-22361.

Sakamoto, Taiji, et al. "Mode-Division Multiplexing Transmission System With DMD-Independent Low Complexity MIMO Processing." Journal of Lightwave Technology 31.13 (2013): 2192-2199.

Sillard, Pierre, et al. "Few-Mode Fiber for Uncoupled Mode-Division Multiplexing Transmissions." 2011 37th European Conference and Exhibition on Optical Communication. OSA. paper Tu.5.LeCervin.7 (2011): 1-3.

Soller, Brian J., et al. "High resolution optical frequency domain reflectometry for characterization of components and assemblies." Optics Express 13.2 (2005): 666-674.

Velazquez-Benitez, A. M., et al. "Six mode selective fiber optic spatial multiplexer." Optics Letters 40.8. Optical Society of America (2015): 1663-1666.

Wang, Bin, et al. "Phase noise mitigation for long-range OFDR using ultrafast frequency sweep." 2016 21st OptoElectronics and Communications Conference (OECC) held jointly with 2016 International Conference on Photonics in Switching (PS). Jul. 3-7, 2016, Niigata, Japan. IEEE (2016): 1-3.

Yuksel, Kivilcim, et al. "Optical Frequency Domain Reflectometry: A Review." 2009 11th International Conference on Transparent Optical Networks. Jun. 28, 2009. Ponta Delgada, Portugal. Paper Tu.C2.5 IEEE (2009): 1-5.

Fontaine, Nicolas K., et al. "Characterization of Space-Division Multiplexing Systems using a Swept-Wavelength Interferometer." Optical Fiber Communication Conference. Optical Society of America, Mar. 17-21, 2013, Anaheim, CA, USA. paper OW1K-2 (2013): 1-3.

Aldoğan, Yuksel, "Rayleigh-based Optical Reflectometry Techniques for Distributed Sensing Applications." International Conference on Engineering Technologies, ICENTE'18. SelçÜniversitesi, Turkey. Oct. 26-28, 2018. (2018): 290-292.

Chen, Zhen, et al. "Terahertz Fiber Bragg Grating for Distributed Sensing." IEEE Photonics Technology Letters 27.10 (2015): 1084-1087.

Ito, Fumihiko, et al. "Long-Range Coherent OFDR With Light Source Phase Noise Compensation." Journal of Lightwave Technology 30.8 (2011): 1015-1024.

Luna, Inc., "How OFDR is Redefining Optical Component Characterization." Whitepaper. (Apr. 13, 2020): 1-8.

Qin, Jie, et al. "Ultra-long range optical frequency domain reflectometry using a coherence-enhanced highly linear frequency-swept fiber laser source." Optics Express 27.14 (2019): 19359-19368.

Tongue, Alex. "Shape Sensing using c-OFDR." Presentation by 4DSP LLC, available online <URL: https://www.nasa.gov/sites/default/files/files/A_Tongue-Shape_Sensing_using_c-OFDR.pdf> (2017): 1-18.

Westbrook, Paul. "Big data on the horizon from a new generation of distributed optical fiber sensors." APL Photonics 5.2, Article 020401 (2020): 1-4.

Zhang, Zhaopeng, et al. "Phase-Noise-Compensated OFDR Realized Using Hardware-Adaptive Algorithm for Real-Time Processing." Journal of Lightwave Technology 37.11 (2018): 2634-2640.

Zhang, Yi Xin, et al. "A visibility enhanced broadband phase-sensitive OTDR based on the UWFBG array and frequency-division-multiplexing." Optical Fiber Technology 53, Article 101995 (2019): 1-8.

Zhao, Shiyuan, et al. "Nonlinearity Correction in OFDR System Using a Zero-Crossing Detection-Based Clock and Self-Reference." Sensors 19 17, Article 3660 (2019): 1-10.

* cited by examiner

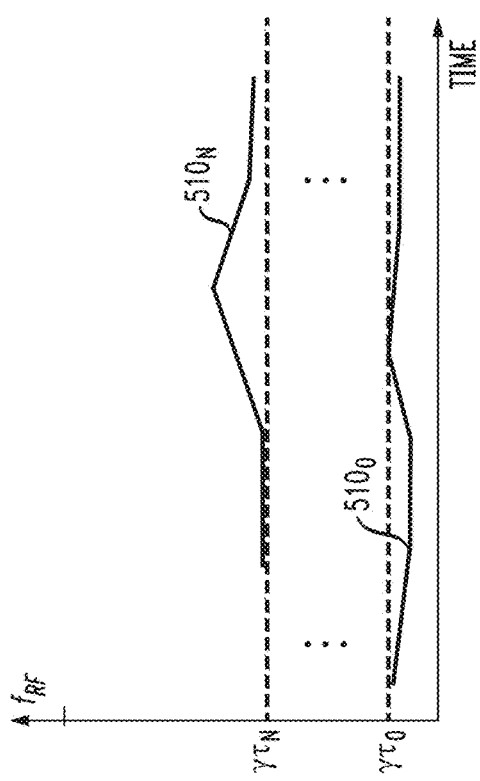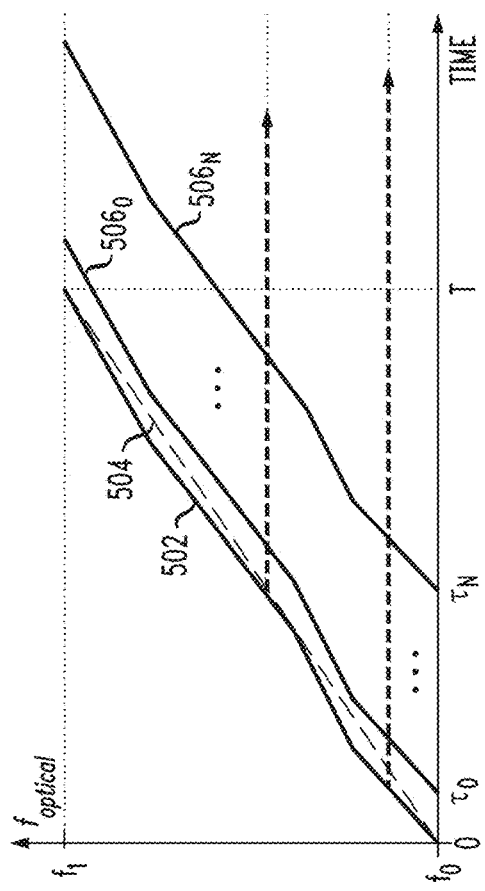

PHASE-DISTORTION MITIGATION FOR AN OPTICAL VECTOR NETWORK ANALYZER

BACKGROUND

Field

Various example embodiments relate to optical metrology and sensing and, more specifically but not exclusively, to testing and/or characterization of optical devices and components.

Description of the Related Art

This section introduces aspects that may help facilitate a better understanding of the disclosure. Accordingly, the statements of this section are to be read in this light and are not to be understood as admissions about what is in the prior art or what is not in the prior art.

Optical vector network analyzers (OVNAs) are used, e.g., to measure complex transfer functions of optical components, devices, and fibers. Some OVNAs employ optical frequency domain reflectometry (OFDR). OFDR is based on measurements of beat interference between two differently delayed light signals originating from the same tunable laser source. Nonlinearities and phase noise in the optical-frequency sweep of the tunable laser source typically result in spectral spreading of the beating signals, which can detrimentally decrease the signal intensity, worsen the spatial resolution, and otherwise limit the usage of the corresponding OVNA.

SUMMARY OF SOME SPECIFIC EMBODIMENTS

Disclosed herein are various embodiments of an OVNA system employing an array of reference delays to estimate distance-variant phase distortion in probe light during an optical-frequency sweep thereof. The estimated distance-variant phase distortion is then used to perform a phase correction for the digital electrical signals generated in response to the probe light being passed through a device under test (DUT) during the same optical-frequency sweep. Advantageously, the performed phase correction enables the OVNA system to provide a more-accurate determination of certain optical characteristics of the DUT than that achievable without such phase correction.

According to an example embodiment, provided is an apparatus, comprising: a tunable laser configured to generate probe light and controllable to sweep an optical frequency of the probe light; a first optical interferometer connected to mix first and second relatively delayed parts of the probe light to generate one or more first optical interference signals such that the first part of the probe light is directed to pass through a device under test, and the second part of the probe light is directed to bypass the device under test; a second optical interferometer connected to mix third and fourth relatively delayed parts of the probe light to generate one or more second optical interference signals, the third part of the probe light passing through an array of reference delays to subject different portions thereof to different delays with respect to the fourth part of the probe light; and a digital signal processor configured to determine one or more optical characteristics of the device under test from measurements of the first and second optical interference signals.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 5A-5B graphically illustrate example signal impairments in the OVNA system of FIG. 1 according to an embodiment;

DETAILED DESCRIPTION

Figure 1:
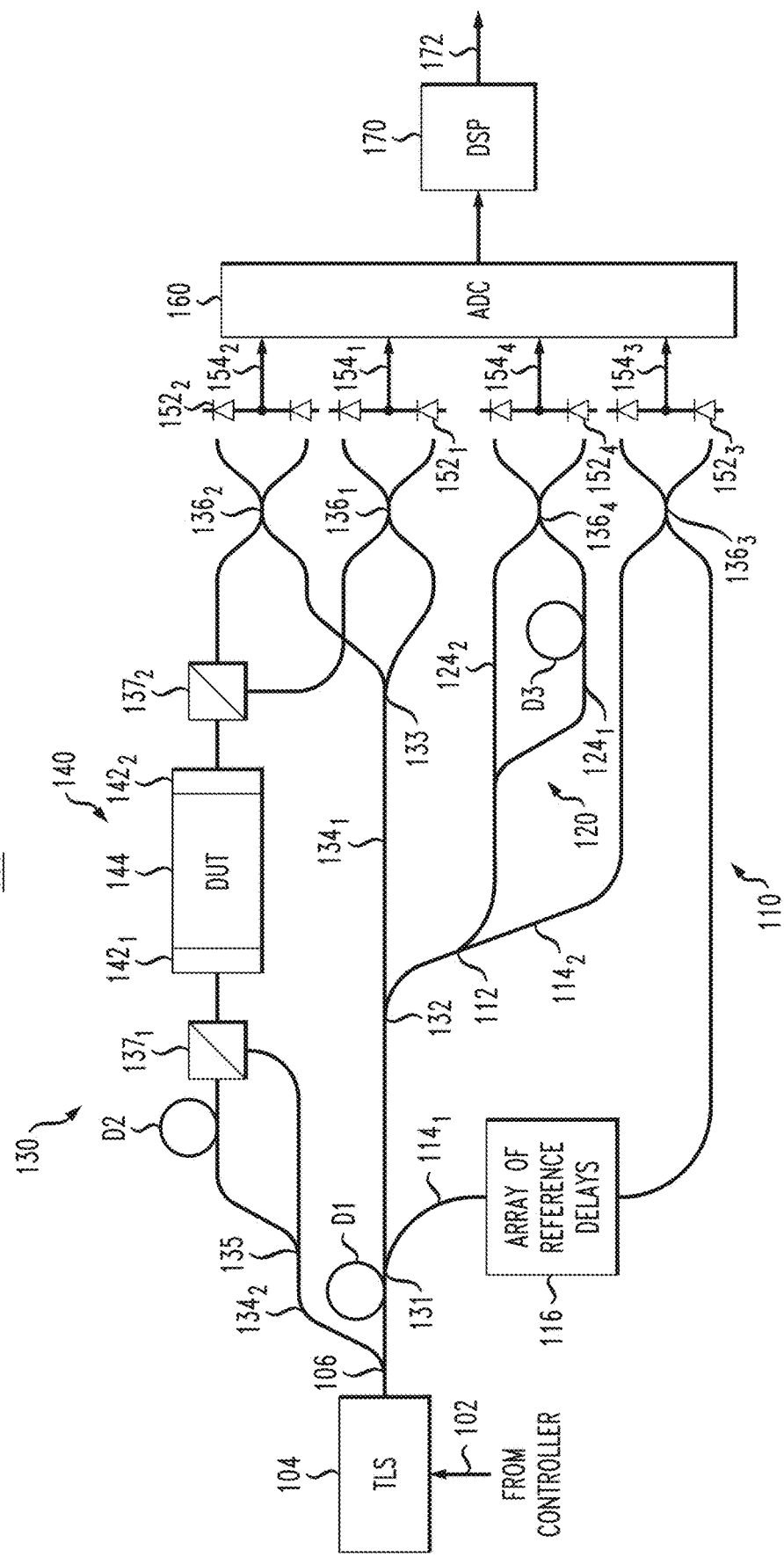
FIG. 1 shows a block diagram of an OVNA system according to an embodiment.

FIG. 1 shows a block diagram of an OVNA system 100 according to an embodiment. System 100 comprises a tunable light source (TLS) 104, interferometers 110, 120, and 130, and an array of photodetectors $152_1$-$152_4$. Each of photodetectors $152_1$-$152_4$ is a balanced photodetector comprising two respective photodiodes connected in a differential configuration. Electrical output signals $154_1$-$154_4$ generated by photodetectors $152_1$-$152_4$, respectively, can be converted into digital form using an analog-to-digital converter (ADC) 160. A digital signal processor (DSP) 170 connected to ADC 160 is configured to: (i) temporarily store the data representing various digital signals received and/or generated by DSP 170, e.g., the sequentially temporally received samples of signals $154_1$-$154_4$; (ii) process the received signal samples, e.g., as described below in reference to FIG. 6; and (iii) output processing results 172 to external circuits, e.g., for viewing, further analysis, and/or storage.

In an example embodiment, TLS 104 may be an about continuously wavelength-tunable, external-cavity laser diode operating in the C and/or L communication bands. An example tuning range may be, e.g., from about 1 nm to about 10 nm and be spectrally located near 1550 nm. The tuning rate may be, e.g., between 10 and 200 nm/s. Parameters of the wavelength (frequency) sweep of TLS 104 can be controlled, e.g., by way of a control signal 102 applied to the TLS by an appropriate controller.

An optical coupler 106 coupled to the output of TLS 104 operates to split the probe light beam generated by the TLS into two portions. Herein, the term "probe light" refers to light that is used to probe (e.g., explore, excite, look into, check out, query, survey, and/or prod) a DUT, e.g., by sending a portion thereof through the DUT and/or reflecting a portion thereof from the DUT. Interaction of said portion (s) with the DUT may change some characteristics/properties of the constituent light, and such changes may then be detected and quantified to determine the corresponding characteristics of the DUT. In some cases, reference light can be used for convenient detection of some of such changes, e.g., through optical mixing, interferometry, etc. In some cases, the reference light may comprise one or more other portion(s) of the probe light that do not interact with the DUT, e.g., by being delivered to the corresponding photodetector(s) through one or more optical paths that bypass the DUT.

A first portion of the probe light beam generated by TLS 104 is applied to a first arm $134_1$ of interferometer 130. A second portion of the probe light beam generated by TLS 104 is applied to a second arm $134_2$ of interferometer 130. In an example embodiment, a 3-dB optical splitter can be used to implement optical coupler 106 to cause TLS 104 to apply equal optical power to interferometer arms $134_1$ and $134_2$ of interferometer 130. In an alternative embodiment, an asymmetric optical splitter can be used to implement optical coupler 106 to cause TLS 104 to apply unequal optical powers to interferometer arms $134_1$ and $134_2$ of interferometer 130.

Interferometer arm $134_1$ of interferometer 130 includes a delay element D1 and optical splitters 131, 132, and 133. Delay element D1 is used to set the relative propagation delay for the interferometer arms $134_1$ and $134_2$ of interferometer 130. Optical splitter 131 connects a first arm $114_1$ of interferometer 110 to the interferometer arm $134_1$ of interferometer 130. Optical splitter 132 connects a second arm $114_2$ of interferometer 110 to the interferometer arm $134_1$ of interferometer 130. Optical splitter 133 couples the interferometer arm $134_1$ of interferometer 130, by way of 2×2 optical couplers $136_1$ and $136_2$, to photodetectors $152_1$-$152_2$.

In an example embodiment, each of optical splitters 131 and 132 can be an asymmetric optical splitter producing an intensity ratio of, e.g., 10:90 or 5:95, and causing the smaller optical power to be branched off from the interferometer arm $134_1$. Optical splitter 133 can be a 3-dB splitter.

The interferometer arm $134_2$ of interferometer 130 includes an optical splitter 135, a delay element D2, a polarization beam splitter (PBS) $137_1$, a device-under-test assembly 140, and a PBS $137_2$. Optical splitter 135 is used to split the light coupled into the interferometer arm $134_2$ by optical coupler 106 between two different optical inputs of PBS $137_1$. Delay element D2 is used to set the relative delay between the optical beams applied to the two different inputs of PBS $137_1$. The delay value of delay element D2 is typically selected such that the DUT assembly 140 receives light of a first (e.g., X) polarization and light of a second (e.g., Y) polarization during different (e.g., non-overlapping) time intervals. The DUT assembly 140 comprises a device under test 144 and optical adapters $142_1$ and $142_2$ that enable the DUT 144 to be appropriately optically coupled between PBS $137_1$ and PBS $137_2$. PBS $137_2$ is configured to direct light of the first polarization received from the DUT assembly 140 to optical coupler $136_1$ and to direct light of the second polarization received from the DUT assembly 140 to optical coupler $136_2$.

In an example embodiment, DUT 144 is a changeable component of interferometer 130, which enables different DUTs to be tested and characterized using system 100. Different DUTs 144 may require different types of optical adapters $142_1$/$142_2$ to be properly connected between the PBSs $137_1$ and $137_2$. As such, system 100 may be supplied with an assortment of optical adapters $142_1$/$142_2$ suitable for connecting different DUTs 144. Two example embodiments of the DUT assembly 140 constructed using different DUTs 144 and different respective sets of optical adapters $142_1$/$142_2$ are described in more detail below in reference to FIGS. 8 and 10.

Interferometer arms $114_1$ and $114_2$ of interferometer 110 are coupled, by way of a 2×2 optical coupler $136_3$, to photodetector $152_3$. The interferometer arm $114_1$ includes an array 116 of reference delays. Example embodiments of array 116 are described below in reference to FIGS. 2-3. The interferometer arm $114_2$ includes an optical splitter 112 to optically couple interferometer 120 thereto. In different embodiments, optical splitter 112 can be an asymmetric optical splitter or a 3-dB optical splitter.

Interferometer arms $124_1$ and $124_2$ of interferometer 120 are coupled, by way of a 2×2 optical coupler $136_4$, to photodetector $152_4$. The interferometer arm $124_1$ includes a delay element D3, which is used to set the relative propagation delay for the interferometer arms $124_1$ and $124_2$. In some embodiments, interferometer 120 is optional and may be absent. In such embodiments, optical splitter 112 may be absent as well.

Figure 2:
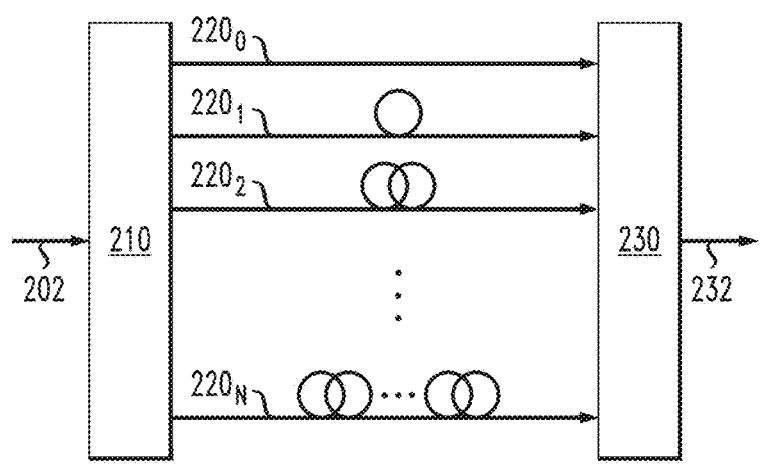
FIG. 2 shows a block diagram of an array of reference delays that can be used in the OVNA system of FIG. 1 according to an embodiment.

FIG. 2 shows a block diagram of array 116 according to an embodiment. This particular embodiment of array 116 is designed to operate in transmission. As shown in FIG. 2, array 116 comprises an optical splitter 210 and an optical combiner 230 connected by optical paths $220_0$-$220_N$, where N is a positive integer. In some embodiments, the number N can be in the range between about five and about one hundred, e.g., $5 \leq N \leq 100$.

Optical splitter 210 is connected to receive an optical signal 202 from the corresponding output port of optical splitter 131 (also see FIG. 1) and operates to split the received optical signal into (N+1) approximately equal portions, which are then directed through optical paths $220_0$-$220_N$, respectively. Optical paths $220_0$-$220_N$ have different respective optical lengths. In an example embodiment, the optical length $d_n$ of optical path $220_n$ can be in accordance with Eq. (1):

$$d_n = d_0 + nd \qquad (1)$$

where $d_0$ is the optical length of optical path $220_0$; d is a constant; and n=0, 1, . . . , N. After propagating through optical paths $220_0$-$220_N$, the variously delayed portions of optical signal 202 are combined in optical combiner 230, and a resulting optical signal 232 is directed toward optical coupler $136_3$ (also see FIG. 1).

Figure 3A:
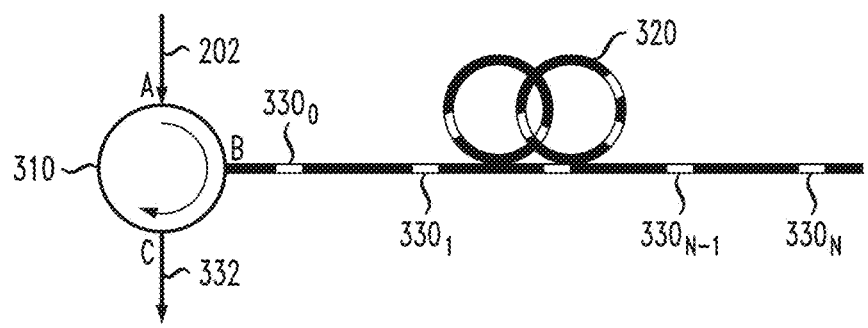
FIGS. 3A-3B schematically show an array of reference delays that can be used in the OVNA system of FIG. 1 according to another embodiment.
Figure 3B:
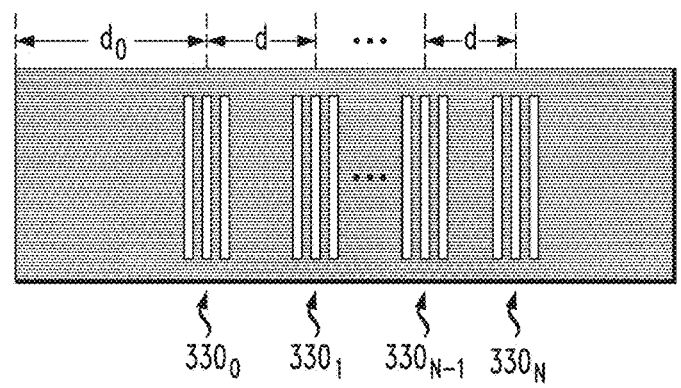

FIGS. 3A-3B schematically show array 116 according to another embodiment. More specifically, FIG. 3A shows a block diagram of array 116. FIG. 3B shows a more detailed view of an optical fiber 320 used in the array 116 of FIG. 3A. In this particular embodiment, optical fiber 320 operates in reflection.

Referring to FIG. 3A, array 116 comprises an optical circulator 310 having three optical ports, labeled A, B, and C. Optical port A of optical circulator 310 is connected to receive optical signal 202 from the corresponding output port of optical splitter 131 (also see FIG. 1). Optical circulator 310 operates to couple the received optical signal into optical fiber 320, which is connected to optical port B thereof. The coupled optical signal undergoes multiple partial reflections within optical fiber 320, e.g., as explained below. Optical circulator 310 operates to receive at optical port B the partial reflections produced in optical fiber 320 and direct a resulting optical signal 332 from optical port B to optical port C thereof. Optical port C then directs optical signal 332 toward optical coupler $136_3$ (also see FIG. 1).

Referring both to FIGS. 3A and 3B, optical fiber 320 has a plurality of separate and distinct distributed Bragg reflectors (DBRs) $330_0$-$330_N$ along the fiber length. In an example embodiment, the locations of DBRs $330_0$-$330_N$ can be in accordance with Eq. (1), wherein $d_n$ denotes the length of fiber between optical port B of optical circulator 310 and DBR $330_n$, where n=0, 1, ..., N (also see FIG. 3B). Each of DBRs $330_0$-$330_N$ may have a relatively small reflectivity, e.g., such that only a small portion (e.g., ca. 1%) of the light impinging on any individual DBR is reflected back, and multiple reflections of the same light by multiple DBRs are insignificantly small (also see FIG. 4). In some embodiments, different DBRs $330_n$ may be nominally identical. In some other embodiments, different DBRs $330_n$ may differ from each other in one or more characteristics, such as reflectivity, spatial period, and/or separation from the adjacent DBRs $330_{n-1}$ and $330_{n+1}$.

Figure 4:
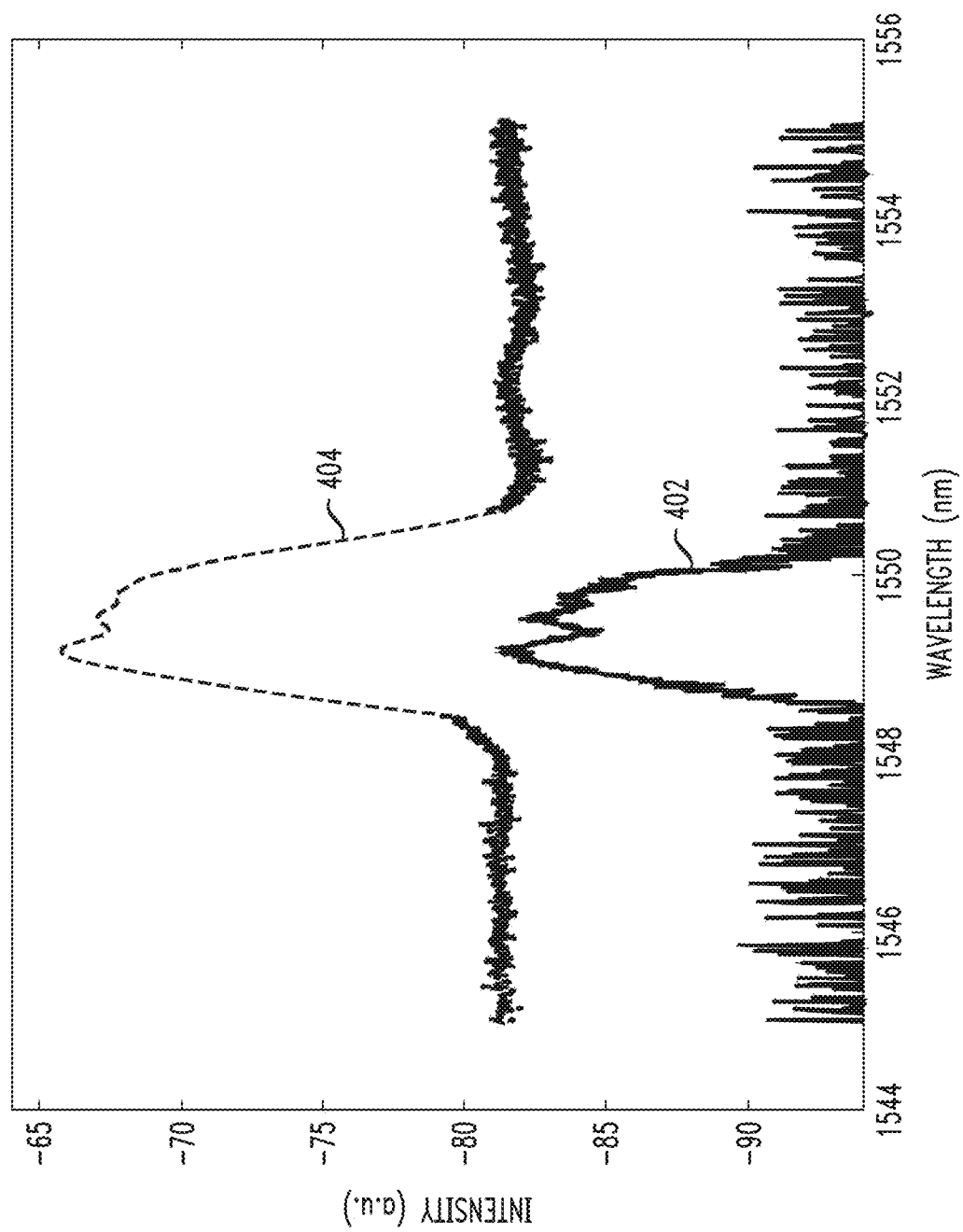
FIG. 4 graphically illustrates spectral characteristics of an optical fiber that can be used in the array of reference delays of FIG. 3 according to an embodiment.

FIG. 4 graphically illustrates spectral characteristics of optical fiber 320 according to an embodiment. More specifically, curve 402 shows the reflection spectrum of a single DBR $330_n$. Curve 404 shows the reflection spectrum of optical fiber 320 having N+1=200 DBRs $330_n$. Curve 404 clearly shows a prominent reflection band spectrally located near 1550 nm. The spectral width of this reflection band is approximately 2 nm. A person of ordinary skill in the art will understand that such an optical fiber 320 is suitable for OVNA measurements in which the wavelength sweep of TLS 104 is such that the start and end wavelengths thereof are located within the reflection band indicated by curve 404.

In an example embodiment, the peak reflectivity of the reflection band indicated by curve 404 can be smaller than about −10 dB. In general, the maximum reflectivity of optical fiber 320 in the pertinent spectral band can be selected based on an acceptable tradeoff between the accuracy of phase-distortion estimation and the maximum distance for which the phase distortion can be reliably estimated. More specifically, stronger reflectivity helps to obtain a higher signal-to-noise ratio (SNR) in the reference channel of system 100, thereby improving the accuracy of phase-distortion estimation. On the other hand, stronger reflectivity limits the total number of optically accessible DBRs $330_n$ due to the accumulated transmission losses along the length of optical fiber 320, thereby limiting the reach.

For illustration purposes and without any implied limitations, various example embodiments are described below in reference to the embodiment of array 116 shown in FIGS. 3A-3B. Based on the provided description, a person of ordinary skill in the pertinent art will be able to make and use alternative embodiments in which array 116 is different from that shown in FIGS. 3A-3B. For example, in different embodiments, array 116 may be designed to operate in transmission or in reflection. In one of the latter embodiments, optical fiber 320 may be modified to have a plurality of splices between fiber sections instead of DBRs $330_n$. The reflective characteristics of each of such fiber splices can be controlled, e.g., by appropriate coating of the corresponding fiber facets prior to joining them together, etc.

Referring back to FIG. 1, control signal 102 can be used to cause TLS 104 to perform a wavelength (optical frequency) sweep, thereby causing system 100 to perform measurements of DUT 144. In response to the wavelength sweep, interferometer 120 and photodetector $152_4$ generate an electrical signal $154_4$ having an RF beat frequency (hereafter $f_3$) determined by the delay value of the delay element D3. DSP 170 may have: (i) a digital band-pass filter centered on the frequency $f_3$; and (ii) circuitry configured to compare the output of the digital band-pass filter with a fixed threshold value and to trigger digital acquisition of signals $154_1$, $154_2$, and $154_3$ when the fixed threshold is exceeded.

In embodiments in which interferometer 120 and photodetector $152_4$ are absent, a similar acquisition trigger may be implemented using signal $154_3$. More specifically, detection therein of the frequency tone corresponding to the reflection from DBR $330_0$ (see FIG. 3A) can be used to trigger the digital acquisition of signals $154_1$, $154_2$, and $154_3$ for DSP 170.

FIGS. 5A-5B graphically illustrate example signal impairments in system 100 according to an embodiment. More specifically, FIG. 5A graphically illustrates spectral and temporal characteristics of some optical signals received by photodetector $152_3$. FIG. 5B graphically illustrates spectral and temporal characteristics of the corresponding electrical RF signal $154_3$ generated by photodetector $152_3$.

The following simplified mathematical description may be helpful for better understanding of the graphs shown in FIGS. 5A-5B.

The optical-frequency sweep of TLS 104 is intended to be strictly linear. In this ideal scenario, the carrier frequency f(t) of the optical output signal generated by TLS 104 is in accordance with Eq. (2):

$$\frac{f(t) - f_0}{f_1 - f_0} = \frac{t}{T} \qquad (2)$$

where t is time; $f_0$ is the carrier frequency at the start of the optical-frequency sweep at t=0; T is the total duration of the optical-frequency sweep; and $f_1$ is the carrier frequency at the end of the optical-frequency sweep at t=T. The corresponding optical-frequency sweep rate $\gamma$ is constant and can be expressed as $\gamma=(f_1-f_0)/T$.

In reality, the optical-frequency sweep of TLS 104 is not linear, which causes the carrier frequency f(t) to deviate from Eq. (2), generally in an unpredictable and nonlinear manner. After factoring out the average carrier frequency during the optical-frequency sweep, the corresponding (constant amplitude) optical signal r(t) generated by TLS 104 can be expressed as follows:

$$r(t)=\exp(j[\pi\gamma t^2+\theta(t)]) \qquad (3)$$

where $\theta(t)$ is the time-dependent phase representing both frequency deviations from Eq. (2) and other phase noise present in the optical output signal of TLS 104. A delayed copy of optical signal r(t) is given by Eq. (4):

$$r(t-\tau)=\exp(j[\pi\gamma(t-\tau)^2+\theta(t-\tau)]) \qquad (4)$$

where $\tau$ is the delay time. Coherent detection, such as that implemented using photodetector $152_3$, may substantially detect the product of $r(t-\tau)$ and $r(t)^*$. The corresponding component of electrical RF signal $154_3$, denoted below as $s(t,\tau)$, can be approximated using Eq. (5):

$$s(t,\tau)=\exp(j[-2\pi\gamma t\tau+\pi\gamma\tau^2+\Delta\theta(t,\tau)]) \qquad (5)$$

where $\Delta\theta(t,\tau)$ is given by Eq. (6):

$$\Delta\theta(t,\tau)=\theta(t-\tau)-\theta(t) \qquad (6)$$

Typically, the value of $\Delta\theta(t,\tau)$ becomes larger as the delay time $\tau$ increases. Electrical RF signal $154_3$, denoted below as $S(t)$, can then be approximated as a sum of the signal components $s(t,\tau)$ corresponding to different delay times $\tau_n$, e.g., as follows:

$$S(t) = \sum_{n=0}^{N} s(t, \tau_n) \quad (7)$$

Referring to FIG. 5A, trace 502 graphically shows the waveform of an example optical-frequency sweep that may be generated by TLS 104. A straight dashed line 504 represents a corresponding linear sweep in accordance with Eq. (2). Noticeable deviations of trace 502 from the straight line 504 are visually evident in FIG. 5A. An optical signal corresponding to trace 502 may be applied to the 2×2 optical coupler $136_3$ through the interferometer arm $114_2$ of interferometer 110. Array 116 of FIG. 3A in effect operates to generate multiple variously delayed, attenuated copies of this optical signal and to apply the resulting combined optical signal to the 2×2 optical coupler $136_3$ through the interferometer arm $114_1$ of interferometer 110. For example, trace $506_0$ in FIG. 5A corresponds to the attenuated signal copy generated by the reflection from DBR $330_0$ (also see FIG. 3A). The delay time between traces 502 and $506_0$ is $\tau_0$, as indicated on the time axis of FIG. 5A. Trace $506_N$ in FIG. 5A corresponds to the attenuated signal copy generated by the reflection from DBR $330_N$ (also see FIG. 3A). The delay time between traces 502 and $506_N$ is $\tau_N$, as further indicated on the time axis of FIG. 5A. Intermediate traces $506_1$-$506_{N-1}$ corresponding to the reflections from DBRs $330_1$-$330_{N-1}$, respectively, are not explicitly shown in FIG. 5A for simplification. A person of ordinary skill in the art will understand that each of traces $506_0$-$506_N$ may be a correspondingly shifted copy of trace 502.

Referring to both FIGS. 5A and 5B, interference at photodetector $152_3$ of the optical signals corresponding to the traces 502 and $506_0$ produces, in electrical RF signal $154_3$, a time-dependent RF beat frequency $F_0(t)$ located near the RF frequency $\gamma\tau_0$. Trace $510_0$ in FIG. 5B shows an example time dependence of $F_0(t)$. Interference at photodetector $152_3$ of the optical signals corresponding to the traces 502 and $506_N$ produces, in electrical RF signal $154_3$, a time-dependent RF beat frequency $F_N(t)$ located near the RF frequency $\gamma\tau_N$. Trace $510_N$ in FIG. 5B shows an example time dependence of $F_N(t)$. Traces $510_1$-$510_{N-1}$ representing time-dependent RF beat frequencies $F_1(t), \ldots, F_{N-1}(t)$, respectively, are not explicitly shown in FIG. 5B for simplification. A person of ordinary skill in the art will understand that a trace $510_n$ is located near the RF frequency $\gamma\tau_n$ and is generated by interference of the optical signals corresponding to the traces 502 and $506_n$. Deviations of trace $506_n$ from the constant frequency $\gamma\tau_n$ represent $\Delta\theta(t,\tau)$ (also see Eq. (5)).

Figure 6:
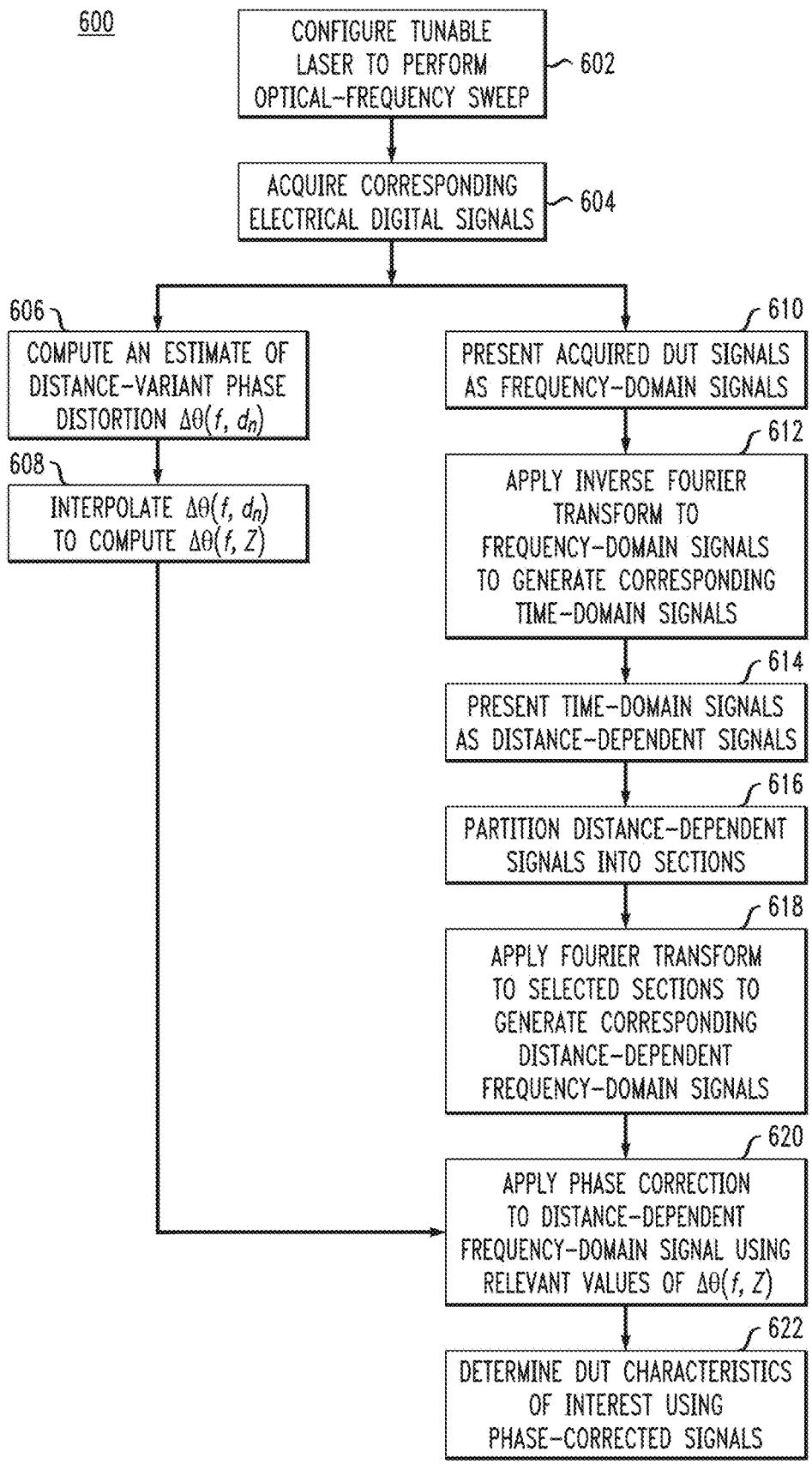
FIG. 6 shows a flowchart of an operating method that can be used to perform measurements and analyses of a device under test (DUT) in the OVNA system of FIG. 1 according to an embodiment.

FIG. 6 shows a flowchart of an operating method 600 that can be used to perform measurements and analyses of a DUT 144 in system 100 according to an embodiment. Method 600 includes signal-acquisition steps and signal-processing steps.

At step 602 of method 600, TLS 104 is configured to perform an optical-frequency sweep in response to an appropriate control signal 102. While the corresponding controller is typically programmed for a linear sweep, e.g., in accordance with Eq. (2), optical phase noise and/or driving-electronics imperfections may cause the actual optical-frequency sweep to be qualitatively similar to that indicated by trace 502 in FIG. 5A.

At step 604, ADC 160 and DSP 170 are triggered to acquire, in digital form, electrical signals $154_1$-$154_3$ generated in response to the optical-frequency sweep of step 602. Electrical signal $154_4$ may be used to provide the corresponding electrical trigger signal to start the acquisition, e.g., as already explained above in reference to FIG. 1. The digital form of signals $154_1$-$154_3$ may be stored for further processing in a memory accessible to DSP 170.

In an example embodiment, steps 606-622 of method 600 may be organized in two separate processing branches. The first processing branch may include steps 606-608 directed at processing the acquired signal $154_3$. The second processing branch may include steps 610-622 directed at processing the acquired signals $154_1$-$154_2$. At some point of the processing sequence, an input from the first processing branch may be provided to the second processing branch, e.g., as indicated in FIG. 6. In such an embodiment, steps 606-608 may be executed in parallel with some part of sequence 610-618, e.g., using parallel-processing hardware and/or software.

In an alternative embodiment, steps 606-622 of method 600 may be executed serially, e.g., in the numbering order.

At step 606, DSP 170 is configured to compute an estimate of the distance-variant phase distortion $\Delta\theta(f, d_n)$, where $d_n$ denotes the location of DBR $330_n$ in optical fiber 320; f is the optical frequency; and n=0, 1, . . . , N. The distances $d_n$ are usually known from the pertinent specifications of optical fiber 320 (see, e.g., FIG. 3B and Eq. (1)).

In an example embodiment, step 606 may include the following sub-steps:

(A) Fitting the acquired digital form of signal $154_3$ using Eqs. (5) and (7) to determine $\Delta\theta(t,\tau_n)$;
(B) Converting $\Delta\theta(t,\tau_n)$ into $\Delta\theta(t,d_n)$. For example, the values of $\tau_n$ and $d_n$ can be easily interconverted using the speed of light in optical fiber 320; and
(C) Computing $\Delta\theta(f,d_n)$ as a Fourier transform of $\Delta\theta(t,d_n)$.

At step 608, DSP 170 is configured to compute $\Delta\theta(f,Z)$ by interpolating $\Delta\theta(f,d_n)$, where Z is a continuous variable representing the distances in the range from $d_0$ to $d_N$.

Figure 7A:
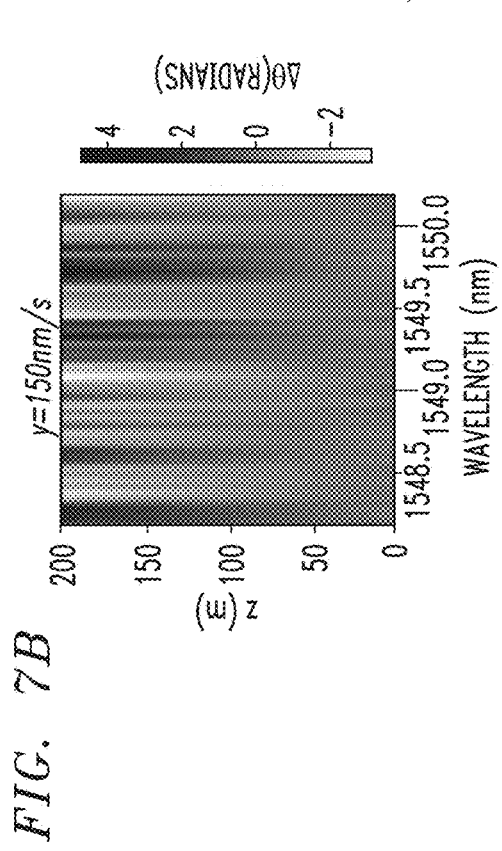
FIGS. 7A-7D graphically show several example estimates of the distance-variant phase distortion that may be computed during different runs of the operating method of FIG. 6.
Figure 7B:
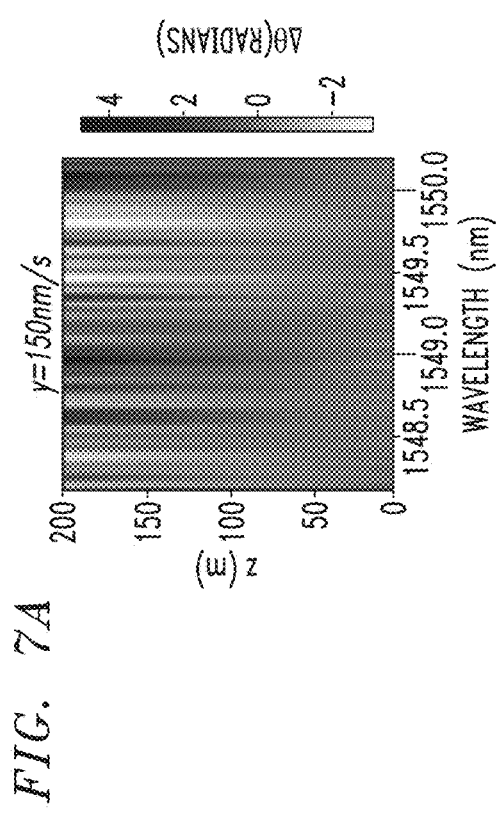
Figure 7C:
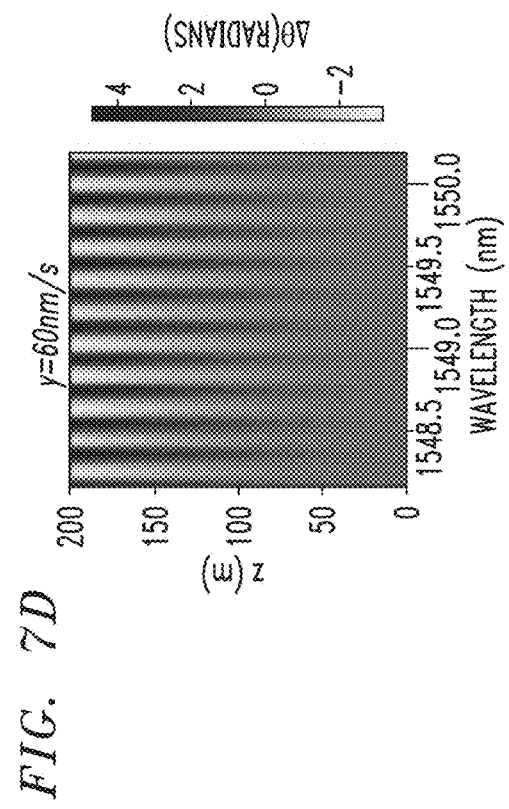
Figure 7D:
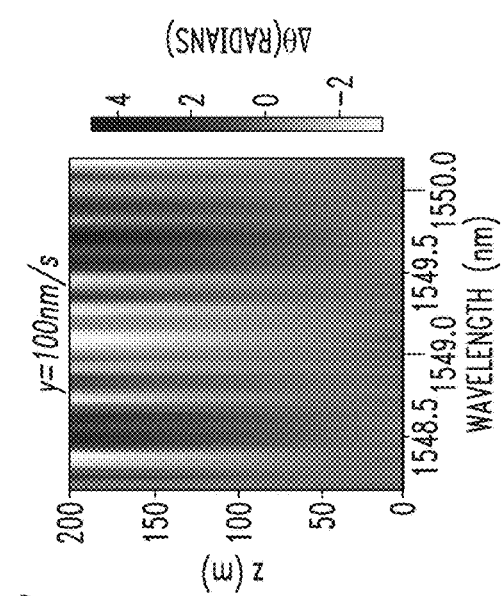

FIGS. 7A-7D graphically show several examples of the distance-variant phase distortion $\Delta\theta(f,Z)$ computed at step 608 of different representative runs of method 600. More specifically, FIGS. 7A and 7B graphically show the distance-variant phase distortion $\Delta\theta(f,Z)$ corresponding to two different optical-frequency sweeps, both of which have the same sweep rate $\gamma$=150 nm/s. FIG. 7C graphically shows the distance-variant phase distortion $\Delta\theta(f,Z)$ corresponding to an example optical-frequency sweep having the frequency sweep rate $\gamma$=100 nm/s. FIG. 7D graphically shows the distance-variant phase distortion $\Delta\theta(f,Z)$ corresponding to an example optical-frequency sweep having the frequency sweep rate $\gamma$=60 nm/s.

Comparison of the results shown in FIGS. 7A and 7B indicates that the distance-variant phase distortion $\Delta\theta(f,Z)$ can vary from sweep to sweep, even if the frequency sweep rate $\gamma$ is constant. Comparison of the results shown in FIGS. 7B-7D indicates that the overall pattern of distance-variant phase distortion $\Delta\theta(f,Z)$ can change significantly when the frequency sweep rate $\gamma$ is changed. Taken together, the results shown in FIGS. 7A-7D underscore the need for determining the distance-variant phase distortion $\Delta\theta(f,Z)$ at each optical-frequency sweep to enable the corresponding DUT characteristics to be determined more accurately.

At step 610, DSP 170 is configured to present the digital form of signals 154$_1$ and 154$_2$ as frequency-dependent signals. More specifically, when acquired, the digital waveforms representing signals 154$_1$ and 154$_2$ are typically saved as a function of time referenced to the acquisition-trigger time. The acquisition-trigger time can however be directly related to the sweeping time, which can then be substituted by the optical frequency, e.g., using Eq. (2).

At step 612, DSP 170 is configured to apply an inverse Fourier transform to the frequency-domain signals obtained at step 610 to generate the corresponding time-domain signals. Such a time-domain signal corresponding to electrical signal 154$_1$ is denoted herein as $S_X(t)$. Similarly, the time-domain signal corresponding to electrical signal 154$_2$ is denoted herein as $S_Y(t)$. Herein, the subscripts X and Y refer to the X and Y polarizations, respectively, of the probe light.

At step 614, DSP 170 is configured to present the signals $S_X(t)$ and $S_Y(t)$ of step 612 as functions of the effective distance Z along the second arm 134$_2$ of interferometer 130. In this case, the time t can be related to the distance Z using the speed of light in the arm 134$_2$. The resulting signals are denoted herein as $S_X(t, Z)$ and $S_Y(t, Z)$.

At step 616, DSP 170 is configured to slice the signals $S_X(t, Z)$ and $S_Y(t, Z)$ into sections more suitable for performing the relevant analyses. For example, an i-th section of $S_X(t, Z)$, denoted herein as $S_X(t, Z_i)$, may correspond to the distances $Z_i$ confined to the interval defined by the inequality $Z_s^{(i)} \leq Z_i \leq Z_e^{(i)}$, where $Z_s^{(i)}$ denotes the start the i-th section, and $Z_e^{(i)}$ the end the i-th section. Similarly, the j-th section of $S_Y(t, Z)$, denoted herein as $S_Y(t, Z_j)$, may correspond to the distances $Z_j$ confined to the interval defined by the inequality $Z_s^{(j)} \leq Z_j \leq Z_e^{(j)}$, where $Z_s^{(j)}$ denotes the start the j-th section, and $Z_e^{(j)}$ the end the j-th section.

At step 618, DSP 170 is configured to apply a Fourier transform to a selected set of sections $S_X(t, Z_i)$ and $S_Y(t, Z_j)$ thereby generating the corresponding frequency-domain signals $S_X(f, Z_i)$ and $S_Y(f, Z_j)$.

At step 620, DSP 170 is configured to apply phase correction to the frequency-domain signals $S_X(f, Z_i)$ and $S_Y(f, Z_j)$ by subtracting from the phases thereof the relevant values of the distance-variant phase distortion $\Delta\theta(f,Z)$ computed at step 608. The resulting phase-corrected signals are denoted herein as $S_X'(f, Z_i)$ and $S_Y'(f, Z_j)$.

At step 622, DSP 170 is configured to use the phase-corrected signals $S_X'(f, Z_i)$ and $S_Y'(f, Z_j)$ obtained at step 620 to determine the DUT characteristics of interest. Examples of such DUT characteristics may include but are not limited to the complex transfer functions, impulse responses, power-coupling matrices, mode-dependent loss (MDL), etc. Representative examples of the DUT characteristics that may be determined at step 622 are shown, e.g., in FIGS. 9A-9B.

Figure 8:
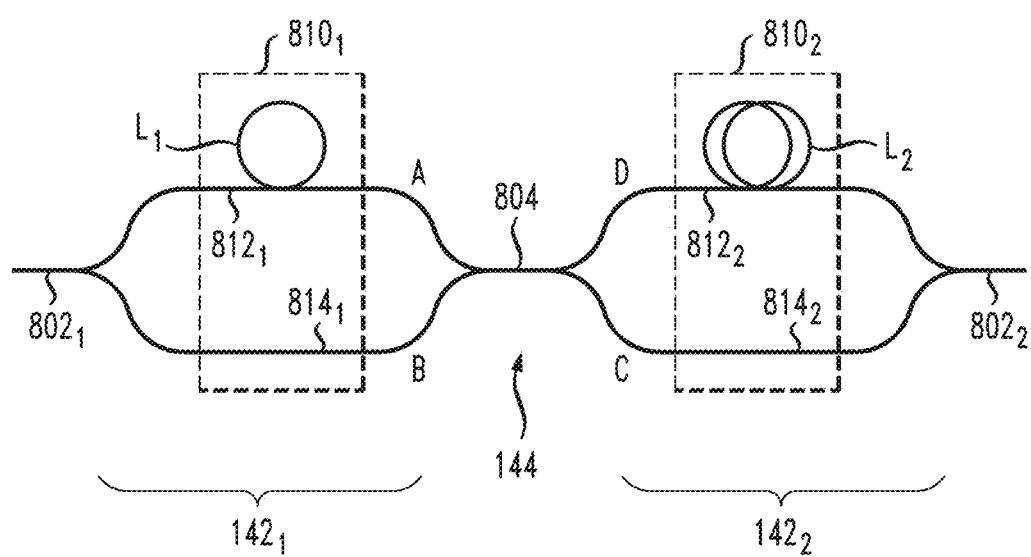
FIG. 8 shows a block diagram of a DUT assembly that can be used in the OVNA system of FIG. 1 according to an embodiment.

FIG. 8 shows a block diagram of a DUT assembly 140 according to an embodiment. As shown in FIG. 8, DUT assembly 140 comprises: (i) 3-dB optical couplers 802$_1$ and 802$_2$; (ii) a 2×2 fused-fiber optical coupler 804; and (iii) optical delay elements 810$_1$ and 810$_2$. In this particular DUT assembly 140, optical coupler 804 is the DUT 144 (also see FIG. 1). Optical coupler 802$_1$ and optical delay element 810$_1$ implement optical adapter 142$_1$ (also see FIG. 1). Optical coupler 802$_2$ and optical delay element 810$_2$ implement optical adapter 142$_2$ (also see FIG. 1).

Optical coupler 804 has input ports A and B and output ports C and D. Optical delay element 810$_1$ comprises optical paths 812$_1$ and 814$_1$ of different optical lengths, with the difference between the optical lengths being $L_1$. Similarly, optical delay element 810$_2$ comprises optical paths 812$_2$ and 814$_2$ of different optical lengths, with the difference between the optical lengths being $L_2$. The values of $L_1$ and $L_2$ can be selected such that the optical signals traversing optical coupler 804 through different input/output ports are time-demultiplexed to enable separate characterization of the corresponding optical paths through optical coupler 804. For example, the relative propagation delays corresponding to the optical paths B→C, A→C, B→D, and A→D through optical coupler 804 can be expressed as 0, $L_1$, $L_2$, and ($L_1+L_2$), respectively. The corresponding sections of the signals $S_X(t, Z)$ and $S_Y(t, Z)$ can therefore be easily identified and selected at step 616 of method 600 (FIG. 6) for further processing.

In an example embodiment, $L_1$ and $L_2$ can be $L_1$=49 m and $L_2$=108 m. These values of $L_1$ and $L_2$ enable system 100, e.g., to measure, in one frequency sweep, the 4×4 power-coupling matrix between four fundamental input modes and four fundamental output modes of optical coupler 804, wherein each fundamental input mode is identified by one of the input ports A, B and one of the input polarizations X, Y; and each fundamental output mode is identified by one of the output ports C, D and one of the output polarizations X, Y.

Figure 9A:
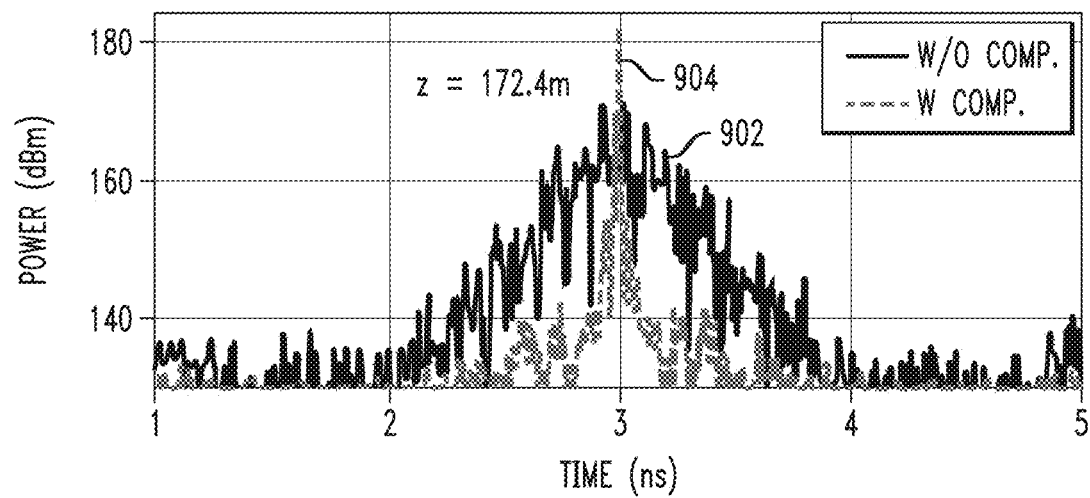
FIGS. 9A-9B graphically illustrate example improvements in the determination of certain characteristics of the DUT shown in FIG. 8 according to an embodiment.
Figure 9B:
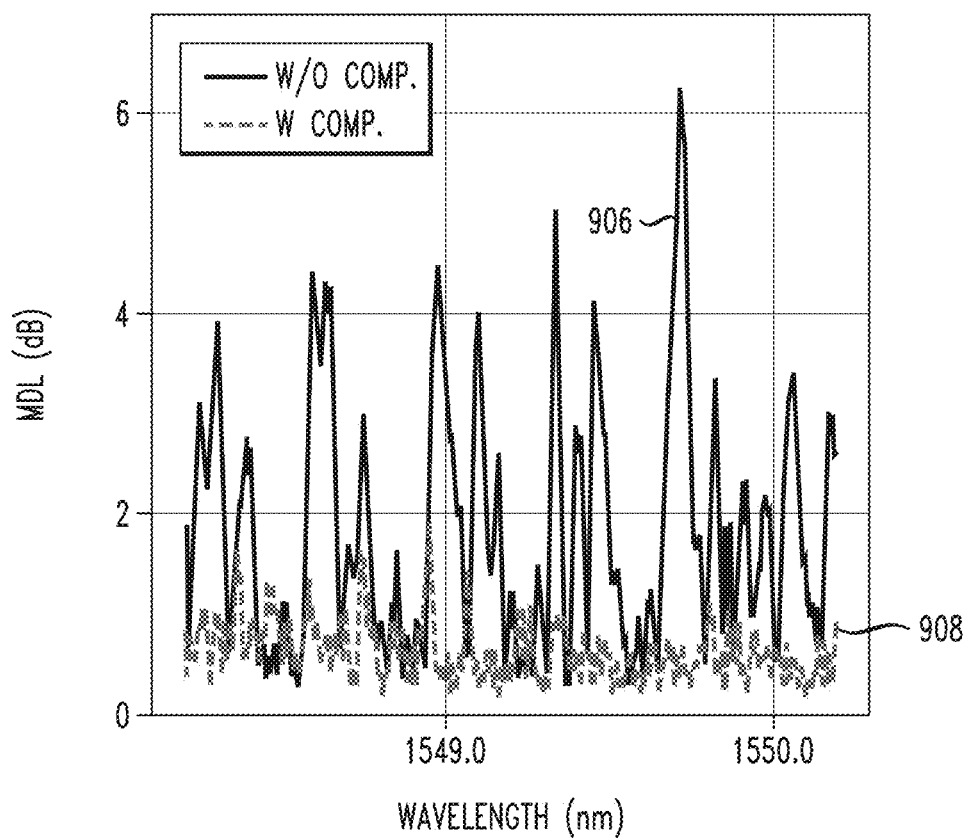

FIGS. 9A-9B graphically illustrate example improvements in the determination of certain characteristics of optical coupler 804 achievable using system 100 and method 600 according to an embodiment. More specifically, FIG. 9A graphically shows example improvements in the determination of the impulse response of optical coupler 804. FIG. 9B graphically shows example improvements in the determination of the MDL of optical coupler 804.

Referring to FIG. 9A, trace 902 graphically shows the measured impulse response of optical coupler 804 at the distance Z=172.4 m obtained in a conventional manner, i.e., without the use of phase correction for the distance-variant phase distortion $\Delta\theta(f,Z)$ (see step 620, FIG. 6). The relatively large FWHM of the impulse response determined in this manner is an artifact caused by the relatively large value of $\Delta\theta(f Z)$ at this distance. Trace 904 graphically shows the measured impulse response of optical coupler 804 when method 600 is used. The aforementioned artifact is thereby removed in trace 904, and a resulting sharp peak of the transfer function has a 5-ps FWHM indicative of a 1-mm spatial resolution. Moreover, this fine spatial resolution can be maintained over the entire measurement range, e.g., at least up to Z=200 m.

Referring to FIG. 9B, trace 906 graphically shows the MDL of optical coupler 804 obtained without the use of phase correction for the distance-variant phase distortion $\Delta\theta(f,Z)$. Trace 906 is evidently very noisy, which makes it difficult to accurately ascertain the MDL. Trace 908 graphically shows the MDL of optical coupler 804 obtained using method 600. Significant noise reduction in this case is clearly evident. More specifically, trace 908 provides a mean measured MDL value of approximately 0.5 dB, which is relatively close to the expected value of substantially 0 dB. The deviation from the expected value is mainly caused by the polarization-power imbalance in the OVNA setup and is expected to get smaller with better balancing of the latter.

Figure 10:
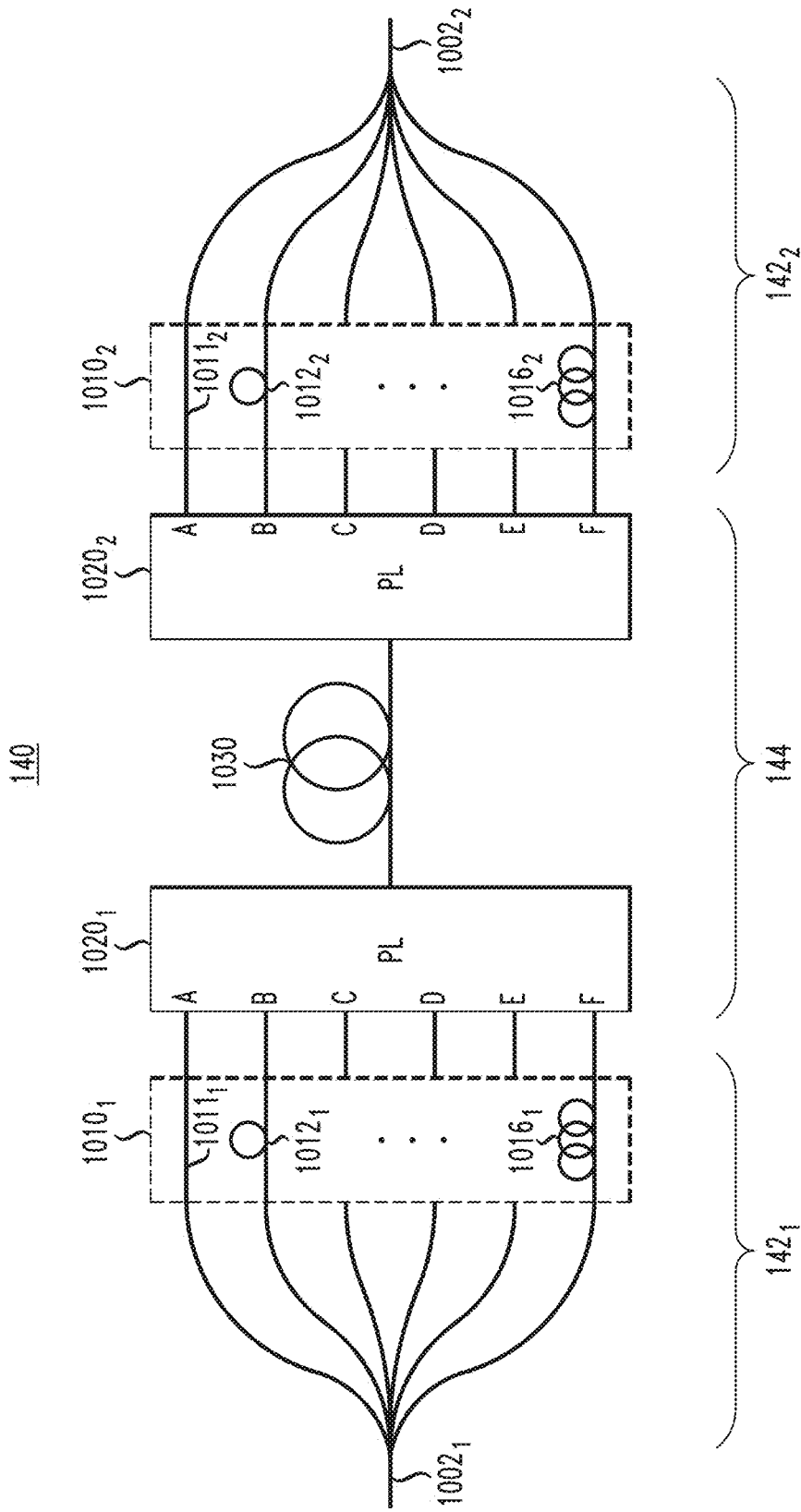
FIG. 10 shows a block diagram of a DUT assembly that can be used in the OVNA system of FIG. 1 according to another embodiment.

FIG. 10 shows a block diagram of a DUT assembly 140 according to another embodiment. As shown in FIG. 10, DUT assembly 140 comprises: (i) 1×6 optical couplers 1002$_1$ and 1002$_2$; (ii) optical delay elements 1010$_1$ and 1010$_2$; (iii) photonic lanterns (PLs) 1020$_1$ and 1020$_2$; and (iv) a 6-mode step-index optical fiber 1030. In this particular DUT assembly 140, the DUT 144 includes PLs 1020$_1$ and 1020$_2$ and optical fiber 1030 (also see FIG. 1). Optical coupler 1002$_1$ and optical delay element 1010$_1$ implement optical adapter $142_1$ (also see FIG. 1). Optical coupler $1002_2$ and optical delay element $1010_2$ implement optical adapter $142_2$ (also see FIG. 1).

PLs $1020_1$ and $1020_2$ are configured to operate as a space-division multiplexer and a space-division demultiplexer, respectively, and each of the PLs is matched to the six transverse modes of optical fiber 1030. The six transverse modes of optical fiber 1030 are $LP_{01}$, $LP_{02}$, $LP_{11e}$, $LP_{11o}$, $LP_{21e}$, and $LP_{21o}$. Each of these modes is polarization-degenerate and may carry X- and Y-polarized light. Each of PLs $1020_1$ and $1020_2$ has seven ports, one of which is a common port and the other six of which are mode-selective ports (labeled in FIG. 10 as A-F). Optical fiber 1030 is end-connected between the common ports of PLs $1020_1$ and $1020_2$. Ports A of the two PLs are optically coupled primarily to the $LP_{01}$ mode of optical fiber 1030. Ports B of the two PLs are optically coupled primarily to the $LP_{02}$ mode of optical fiber 1030. Ports C of the two PLs are optically coupled primarily to the $LP_{11e}$ mode of optical fiber 1030, and so on.

Optical delay element $1010_1$ comprises optical paths $1011_1$-$1016_1$ of different and unique optical lengths. Optical delay element $1010_2$ similarly comprises optical paths $1011_2$-$1016_2$ of different and unique optical lengths. The different optical lengths are selected such as to enable system 100, e.g., to measure, in one frequency sweep, the 12×12 power-coupling matrix of the DUT 144 shown in FIG. 10.

Figure 11:
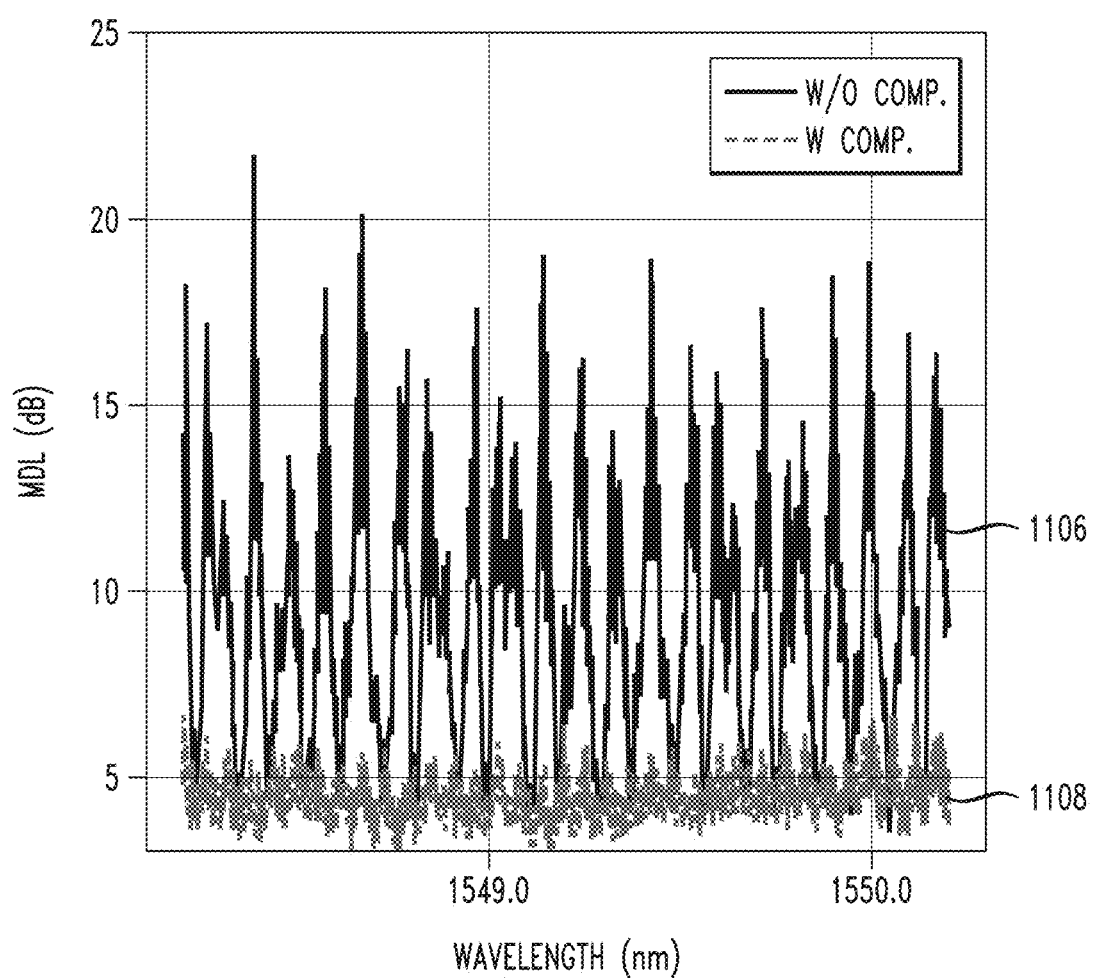
FIG. 11 graphically illustrates example improvements in the determination of certain characteristics of the DUT shown in FIG. 10 according to an embodiment.

FIG. 11 graphically shows example improvements in the determination of the MDL of the DUT 144 shown in FIG. 10. More specifically, trace 1106 graphically shows the MDL of the DUT 144 obtained in a conventional manner, i.e., without the use of phase correction for the distance-variant phase distortion $\Delta\theta(f,Z)$. Trace 1106 is evidently very noisy, which makes it difficult to accurately ascertain the MDL. Trace 1108 graphically shows the MDL of the DUT 144 obtained using method 600. Significant noise reduction in this case is clearly evident.

According to an example embodiment disclosed above, e.g., in the summary section and/or in reference to any one or any combination of some or all of FIGS. 1-11, provided is an apparatus, comprising: a tunable laser (e.g., 104, FIG. 1) configured to generate probe light and controllable to sweep an optical frequency of the probe light; a first optical interferometer (e.g., 130, FIG. 1) connected to mix first and second relatively delayed parts of the probe light to generate one or more first optical interference signals, the first part of the probe light capable of passing through a device under test (e.g., 144, FIG. 1), the second part of the probe light capable of bypassing the device under test; a second optical interferometer (e.g., 110, FIG. 1) connected to mix third and fourth relatively delayed parts of the probe light to generate one or more second optical interference signals, the third part of the probe light passing through an array of reference delays (e.g., 116, FIG. 1) to subject different portions thereof to different delays with respect to the fourth part of the probe light; and a digital signal processor (e.g., 170, FIG. 1) configured to determine one or more optical characteristics of the device under test from measurements of the first and second optical interference signals.

In some embodiments of the above apparatus, the array of reference delays comprises a plurality of optical paths (e.g., $220_0$-$220_N$, FIG. 2) between an optical splitter (e.g., 210, FIG. 2) and an optical combiner (e.g., 230, FIG. 2), different ones of the optical paths having different respective optical lengths.

In some embodiments of any of the above apparatus, the plurality of optical paths comprises at least five different optical paths.

In some embodiments of any of the above apparatus, the array of reference delays comprises an optical fiber (e.g., 320, FIG. 3A) having reflectors (e.g., $330_0$-$330_N$, FIG. 3A) distributed along at least a portion thereof.

In some embodiments of any of the above apparatus, the reflectors are distributed equidistantly (e.g., at separation d, FIG. 3B) along the portion of the optical fiber.

In some embodiments of any of the above apparatus, the optical fiber has at least five separate reflectors.

In some embodiments of any of the above apparatus, the optical fiber has at least one hundred separate reflectors.

In some embodiments of any of the above apparatus, the array of reference delays comprises an optical fiber (e.g., 320, FIG. 3A) having spatially separated gratings (e.g., $330_0$-$330_N$, FIG. 3A) distributed along at least a portion thereof.

In some embodiments of any of the above apparatus, the optical fiber has at least five spatially separated gratings.

In some embodiments of any of the above apparatus, the optical fiber has at least one hundred spatially separated gratings.

In some embodiments of any of the above apparatus, the first optical interferometer comprises a first polarization beam splitter (e.g., $137_1$, FIG. 1).

In some embodiments of any of the above apparatus, the first optical interferometer further comprises a second polarization beam splitter (e.g., $137_2$, FIG. 1), the device under test being optically connected between the first and second polarization beam splitters.

In some embodiments of any of the above apparatus, the first optical interferometer comprises an optical adapter (e.g., $142_1$ or $142_2$, FIG. 1) to have connected thereto multiple optical input ports (e.g., A, B, FIG. 8) or multiple optical output ports (e.g., C, D, FIG. 8) of the device under test.

In some embodiments of any of the above apparatus, the digital signal processor is configured to compute (e.g., at 606, FIG. 6) an estimate of distance-variant phase distortion (e.g., $\Delta\theta(f,Z)$) in the probe light based on the measurements of the one or more second optical interference signals, the distance-variant phase distortion being caused by a nonlinearity of the sweep of the optical frequency of the probe light.

In some embodiments of any of the above apparatus, the digital signal processor is configured to compute (e.g., at 606, FIG. 6) the estimate of the distance-variant phase distortion as a function of the optical frequency of the probe light (e.g., as indicated in FIGS. 7A-7D).

In some embodiments of any of the above apparatus, the digital signal processor is configured to use the estimate (e.g., at 620, FIG. 6) to perform phase correction of a digital electrical signal obtained from the measurements of the one or more first optical interference signals.

In some embodiments of any of the above apparatus, the one or more optical characteristics include one or more of: an optical transfer function of the device under test; a complex impulse response of the device under test; a mode-resolved power-coupling matrix of the device under test; and mode-dependent loss of the device under test.

In some embodiments of any of the above apparatus, the apparatus is an optical vector network analyzer (e.g., 100, FIG. 1).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising:
   a tunable laser configured to generate probe light and controllable to sweep an optical frequency of the probe light;
   a first optical interferometer connected to mix first and second relatively delayed parts of the probe light to generate one or more first optical interference signals such that the first part of the probe light is directed to pass through a device under test, and the second part of the probe light is directed to bypass the device under test;
   a second optical interferometer connected to mix third and fourth relatively delayed parts of the probe light to generate one or more second optical interference signals, the third part of the probe light passing through an array of reference delays to subject different portions thereof to different delays with respect to the fourth part of the probe light; and
   a digital signal processor configured to determine one or more optical characteristics of the device under test from measurements of the first and second optical interference signals.

2. The apparatus of claim 1, wherein the array of reference delays comprises a plurality of optical paths between an optical splitter and an optical combiner, different ones of the optical paths having different respective optical lengths.

3. The apparatus of claim 2, wherein the plurality of optical paths comprises at least five different optical paths.

4. The apparatus of claim 1, wherein the array of reference delays comprises an optical fiber having reflectors distributed along at least a portion thereof.

5. The apparatus of claim 4, wherein the reflectors are distributed equidistantly along the portion of the optical fiber.

6. The apparatus of claim 4, wherein the optical fiber has at least five separate reflectors.

7. The apparatus of claim 4, wherein the optical fiber has at least one hundred separate reflectors.

8. The apparatus of claim 1, wherein the array of reference delays comprises an optical fiber having spatially separated gratings distributed along at least a portion thereof.

9. The apparatus of claim 8, wherein the optical fiber has at least five spatially separated gratings.

10. The apparatus of claim 8, wherein the optical fiber has at least one hundred spatially separated gratings.

11. The apparatus of claim 1, wherein the first optical interferometer comprises a first polarization beam splitter.

12. The apparatus of claim 11, wherein the first optical interferometer further comprises a second polarization beam splitter, the device under test being optically connected between the first and second polarization beam splitters.

13. The apparatus of claim 1, wherein the first optical interferometer comprises an optical adapter to have connected thereto multiple optical input ports or multiple optical output ports of the device under test.

14. The apparatus of claim 1, wherein the digital signal processor is configured to compute an estimate of distance-variant phase distortion in the probe light based on the measurements of the one or more second optical interference signals, the distance-variant phase distortion being caused by a nonlinearity of the sweep of the optical frequency of the probe light.

15. The apparatus of claim 14, wherein the digital signal processor is configured to compute the estimate of the distance-variant phase distortion as a function of the optical frequency of the probe light.

16. The apparatus of claim 14, wherein the digital signal processor is configured to use the estimate to perform phase correction of a digital electrical signal obtained from the measurements of the one or more first optical interference signals.

17. The apparatus of claim 1, wherein the one or more optical characteristics include one or more of:
   an optical transfer function of the device under test;
   an impulse response of the device under test;
   a mode-resolved power-coupling matrix of the device under test; and
   mode-dependent loss of the device under test.

18. The apparatus of claim 1, wherein the apparatus is an optical vector network analyzer.

* * * * *